C. WEST.
BREAK FOR PERAMBULATORS.
APPLICATION FILED AUG. 27, 1907.
924,708.
Patented June 15, 1909.
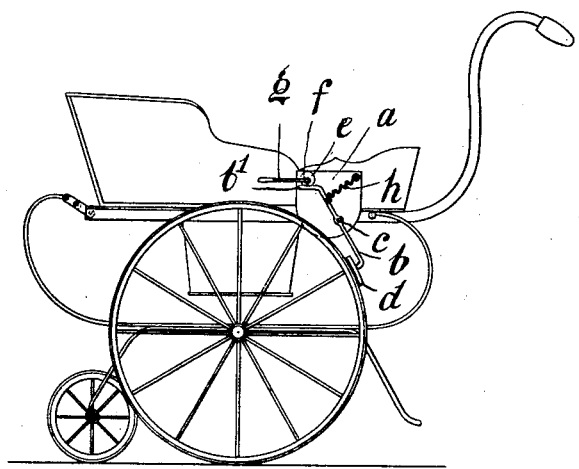
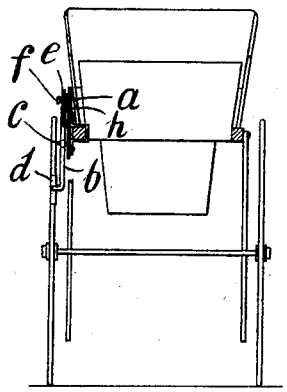
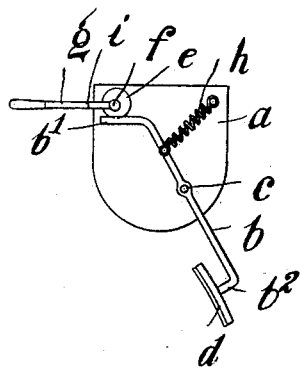
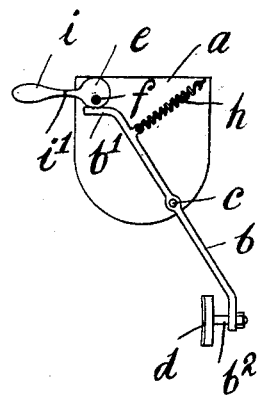
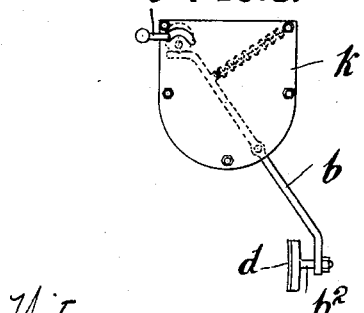
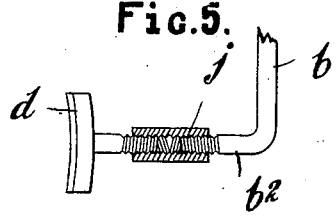

UNITED STATES PATENT OFFICE.

CLIFTON WEST, OF POOLE, ENGLAND.

BRAKE FOR PERAMBULATORS.

No. 924,708.　　　　Specification of Letters Patent.　　　Patented June 15, 1909.

Application filed August 27, 1907. Serial No. 390,337.

*To all whom it may concern:*

Be it known that I, CLIFTON WEST, a subject of His Majesty the King of Great Britain, and resident of The Gates, Carter's Lane, Poole, county of Dorset, in England, have invented certain new and useful Improvements in Braking Means for Perambulators, Mail-Cars, and Like Vehicles, and of which the following is a specification.

This invention relates to improved braking means for perambulators, mail-cars and like vehicles, and has for its object to provide a simple, inexpensive and effective arrangement which can be readily attached to vehicles of the kind referred to and be operatable within the range of a small child. Preferably the braking arrangement is set up upon a plate or bracket so that it is only necessary for fitting the brake to fix such plate or bracket to some convenient part of the vehicle, allowing of course for the proper operation of the brake parts.

To adapt one stock mechanism for vehicles of the kind referred to irrespective of the varying spaces occurring within reasonable limits between the peripheries of the wheels and the sides of the vehicles, I prefer to provide that the brake shoe arm shall be variable in length at will.

With the foregoing and other objects in view I will proceed to describe my invention with reference to the accompanying sheet of drawings in which:

Figure 1 represents a side view of a mail car showing in full outline the preferred arrangement of my invention applied thereto. Fig. 2 is an end view of the car and braking means therefor. Figs. 3, 4 and 6 show embodiments of the invention according to the arrangement thereof preferred as aforesaid. Fig. 5 is a detail view to be hereinafter referred to.

In carrying the invention into effect, I provide a conveniently shaped plate or frame $a$ of metal, wood or other suitable material adapted to be readily attached to the side or other part of a mail-car or like vehicle as by means of bolts, screws, clamps or other appropriate devices. Upon such plate or frame $a$ I pivotally mount a brake lever $b$, one end thereof on one side of the pivot $c$ carries a brake shoe $d$ and the other end thereof on the other side of the said pivot is adapted to be operated upon by a cam such as $e$. This cam $e$ referring to Figs. 1 and 3 is mounted in fixed connection upon a stud shaft $f$ revolubly secured to the plate $a$, so that by rotating the said shaft $f$ as by means of a hand lever $g$, the cam $e$ turns with the shaft and imparts pivotal movement to the brake lever $b$.

Preferably the brake-lever $b$ is bent horizontally at $b^1$ for economizing space and such part $b^1$ may conveniently be grooved for permitting the periphery of the cam to engage therein and so obviate lateral play of the brake-lever.

The brake lever $b$ as shown is placed under the influence of a spring such as $h$ either operating to pull (as shown) or press over the brake-lever to bring the brake-shoe into contact with the wheel when permitted so to do by the position of the cam $e$.

In lieu of the cam being fixed to the stub-shaft $f$, it may as shown in Figs. 4 and 6 be revolubly secured to the stub-shaft fixed to the plate or frame $a$ in which case the cam may then have formed integral therewith or otherwise connected thereto a handle $i$ which may be bent outward at $i^1$ to give the requisite freedom for manipulating the same and to allow it to clear the spring $h$ if necessary.

As shown in Fig. 5, the brake shoe arm $b^2$ projecting at right angles to the brake-lever $b$ is arranged variable in length by dividing said arm and adjustably connecting the inner ends of the divided portions together by a sleeve $j$ threaded internally right and left handed for engaging the inner ends of the divided portions similarly threaded externally. Obviously however other modes of arranging that the brake shoe arm is variable in length at will may be adapted, whereby the varying distances within reasonable limits between the wheels and the bodies, etc. of different vehicles may be quickly compensated. The brake shoe also may be adjustably connected to the brake-shoe arm if desired.

To protect the braking means from the weather, a suitable case or cover $k$ (Fig. 6) may be provided adapted to be detachably connected to the plate or frame $a$, for wholly or partly inclosing the parts thereon, the brake lever $b$, and the handle $(g, i)$, when employed as the medium for operating the cam $e$, working in slots in the sides of said cover. Or the handle $(g, i)$ may be arranged to work in front of the cover (as shown in Fig. 6) thus preventing any slotting of the top thereof.

Having thus described my invention what I claim and desire to secure by Letters Patent is:—

1. In perambulators, mail cars and the like vehicles a plate attachable to a convenient part of the vehicle, said plate having mounted thereon a braking mechanism comprising a pivoted lever having a brake shoe, a cam mounted on a stub shaft revolubly secured to the plate, said cam being adapted to be operated by hand and coöperating with said lever, and a spring for imparting pivotal movement to the brake lever substantially as herein described.

2. In perambulators, mail-cars and the like vehicles a plate attachable to a convenient part of the vehicle, said plate having mounted thereon a braking mechanism comprising a pivoted lever variable in length and having a brake shoe, a cam mounted upon a stub shaft revolubly secured to the plate, said cam being adapted to be operated by hand and coöperating with said lever and a spring for imparting pivotal movement to the brake lever substantially as herein described.

3. In perambulators, mail cars and the like vehicles the combination of a plate attachable to a convenient part of the vehicle, a cover adapted to be detachably connected to said plate, braking mechanism mounted upon said plate comprising a pivoted lever having a brake shoe, a cam adapted to be operated by hand and coöperating with said lever, and a spring for imparting pivotal movement to the brake lever substantially as herein described.

4. In perambulators, mail cars and the like vehicles, the combination of a plate attachable to a convenient part of the vehicle, a cover adapted to be detachably connected to said plate, braking mechanism mounted upon said plate comprising a pivoted lever variable in length and having a brake shoe, a cam adapted to be operated by hand and coöperating with said lever and a spring for imparting pivotal movement to the brake lever substantially as herein described.

In witness whereof I have hereunto set my hand in presence of two witnesses.

CLIFTON WEST.

Witnesses:
 ALBERT GEORGE BARNES,
 LEONARD COULSON.